April 29, 1930.  C. A. WRAGG  1,756,272
MEANS FOR CONTROL OF LIFT AND BALANCE OF AIRCRAFT
Filed Feb. 19, 1926
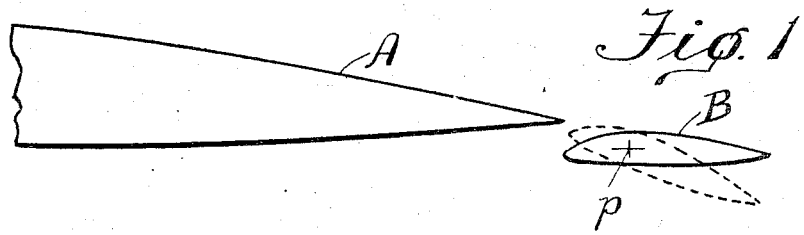
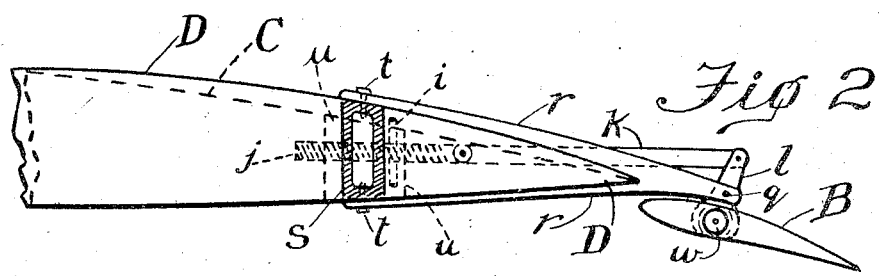
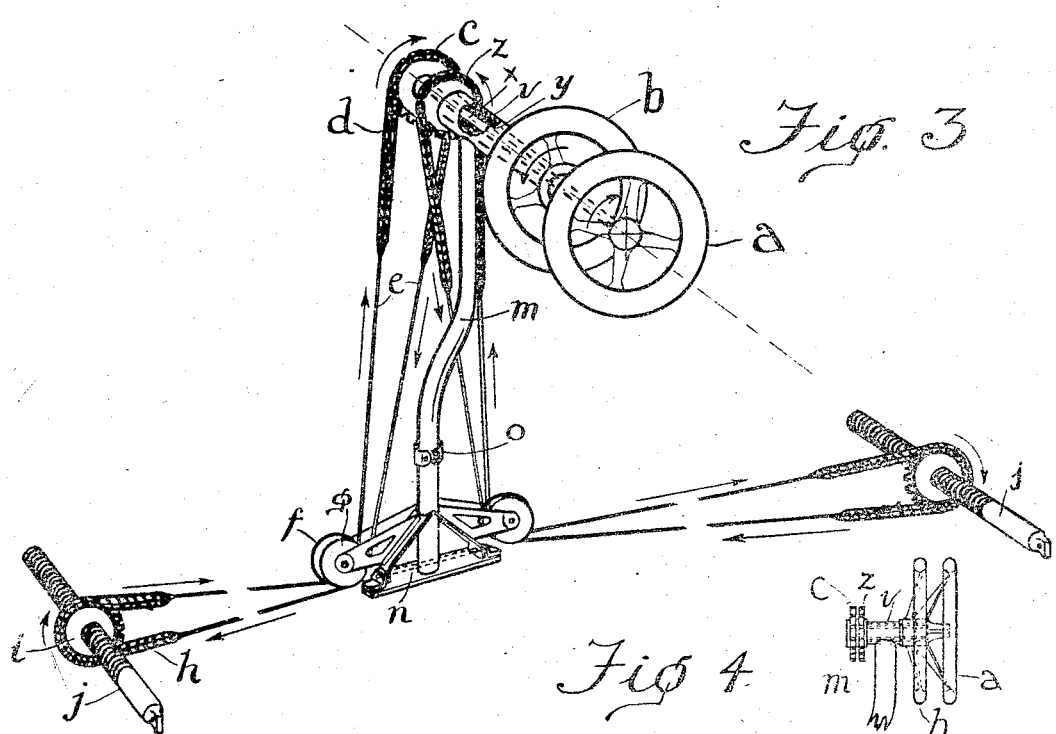
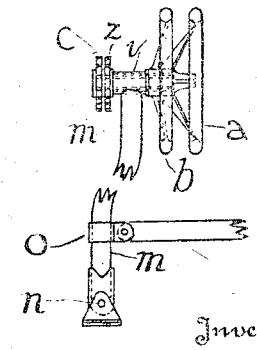
Inventor
Charles A. Wragg Patented Apr. 29, 1930

1,756,272

UNITED STATES PATENT OFFICE

CHARLES ARTHUR WRAGG, OF WASHINGTON, DISTRICT OF COLUMBIA

MEANS FOR CONTROL OF LIFT AND BALANCE OF AIRCRAFT

Application filed February 19, 1926. Serial No. 89,416.

Ordinarily, to restore disturbed equilibrium, the relative lift of the port and starboard wings on aircraft is varied by the use of flaps hinged to the rear portion of the wings, one of said flaps being turned downwardly while the other is turned upwardly; this flap construction has been made in various forms and also used to increase the total lift for landing by pulling down the flaps on both sides in unison. In such structures the surfaces of the flaps normally form a part of the contour of the wing, that is, the front edge of the flap is hinged to the body of the wing, and in normal flight its upper and lower surfaces conform to the cross-section curves of the wing.

Other devices have been proposed in which a rear wing is set below a main wing and adapted to tilt so as to vary its angle and consequently the lift reaction. In my copending application No. 264,365 wings of this type are described, the rear wing being wholly below the forward one.

A primary object of this invention is to provide a compound device of the type comprising a main wing and a relatively small separate auxiliary wing having combined characteristics which enable aircraft to have a vastly improved efficiency and effective control.

Referring to the accompanying drawings:

Fig. 1 is a diagrammatic elevation of my compound wing.

Fig. 2 is another diagrammatic elevation showing deeper rear spar and means to operate the auxiliary wing.

Fig. 3 is a diagrammatic view showing one preferred form of control and operating means.

Fig. 4 is an elevation of the control wheels and column shown in Fig. 3.

I have ascertained by a long series of wind tunnel tests that when a small auxiliary wing B (preferably a good lift section) is set with its leading edge close below but not forward of the trailing edge of a main wing A, said auxiliary being adapted to tilt, the chord of said auxiliary being comparatively small, i. e., 30% or less of the chord of the main wing, a number of most desirable aerodynamic results are obtainable.

I have further discovered that if the auxiliary has a substantial camber on its upper surface and is normally spaced relative to the main wing so that its upper surface is sufficiently close to affect directly the airstream over the upper surface of the main wing, its leading edge being always below the trailing edge of the main wing, then the above mentioned aerodynamic results are augmented to such a degree that actual reduction in the combined coefficient of drag on the compound as compared with the drag of the main wing by itself can be obtained in high-speed settings, while at high angles the lift coefficient is not only greatly increased but the lift curve shows a most remarkably sustained slope beyond the point of maximum lift.

In ordinary standard wings the lift curve at the angle of maximum lift usually drops off quickly, and this drop in lift constitutes a source of great danger, particularly in commercially loaded aircraft; but the lift curve of my invention declines gradually after the maximum point is reached and thus inherently embodies the capacity to avoid the hitherto dangerous stalling of the machine. Particularly in thick-wing types of machine the addition of my auxiliary wing, selected by experiment to suit the main wing, will eliminate the sudden breaks or burble conditions usually found in thick wings. This is one of the principal features of my invention which will make it possible for average individuals to fly safely without the highly specialized training which is necessary to become pilots of present machines.

Another of the above mentioned aerodynamic improvements in my invention is that large percentage changes in the lift at small angles of attack of the main wing, without a material change in the drag, may be produced with a slight change in the angle of the auxiliary wing, and with each successive change the lift curve of the compound not only rises steadily but maintains a form similar to the curves for all the other angular settings of the auxiliary. These aerodynamic improvements are not obtained by any other lift regulating device disclosed, such as flaps, slots, or their combination in wings.

Further, the lift and drag results in my invention are extremely stable compared with those of the main wing alone, and the smoothing out of the radical burble conditions materially improves the stability of the machine. Furthermore, in view of the large range of different wing characteristics which may be obtained by slight changes in the angle of the auxiliary an airplane fitted with my device can fly horizontal at all times even with large changes in its loadings. Thus it will be plain to engineers that the use of my invention would further greatly facilitate commercial aviation for the following reasons:

Greater payload can be transported with a given power;

The lift can be adjusted ideally to variations in load;

The value of L/D can be maintained at a high figure for each setting and its correspond lift value;

The stability is so improved that airplanes can become popular, similarly to automobiles, because of their safety for private ownership and operation.

All these advantages are obtained by a simple structure and a most simple mechanical operation in flight.

I have found that the most desirable coordination of lift-control with sustained values of L/D and stability are all included by my invention when the leading edge of the small auxiliary is just below but not forward of the trailing edge of the main wing. The relative position of my auxiliary wing may be more definitely defined as having its leading edge set below the level of the trailing edge of the main wing to a distance less than the maximum thickness of the wing section. My experiments show that it is desirable that the leading edge of the auxiliary should be quite close to the trailing edge of the main wing yet still be able to move through a considerable arc; therefore, as indicated in Fig. 1, it is preferably adapted to make simple angular adjustments about an axis $p$ approximately at or a little forward of the center of pressure of the small section B. These changes in angle can be made in flight with a minimum of power and with least complication in structure, so that my device can be constructed for attachment to present machines to improve their performance or, for best results, designed for embodiment in new types.

In one preferred structure shown in Fig. 2 I provide a web $r$ attached to the rear spar $s$ by bolts $t$; the auxiliary B is pivoted at a point $q$ above its upper surface, and its smallness permits the pivotal point $q$ to be close to the main wing D, thus reducing structural problems and ensuring a small normal gap without interfering with the range of angles through which it is desirable that the auxiliary B should move.

Another feature which my experiments have brought out is that the use of the small auxiliary wing in my invention enables the maximum ordinate of the upper surface of the main wing to be set farther back than in the usual wing, thus deepening the rear spar, which reduces weight and structural difficulty and amply provides for the loading on the auxiliary surface B; or the maximum upper ordinate may be as usual and the succeeding ordinates aft kept higher than usual, thus increasing the depth of the rear spar. This is clearly shown in Fig. 2, the spar $s$ of my wing being indicated as deeper than the spar $u$ in the best types of ordinary wing C shown in broken lines. As a rule, individual wings have their maximum upper ordinate at about .33 chord back from the leading edge, and this largely determines the depth of the rear spar and to some extent the weight of the wing. But the effect of my invention is that the auxiliary straightens out the vortices in the flow above the main wing and distributes the pressure forces more evenly. This enables the maximum upper ordinate to be farther back or the section thickened aft, yet resulting in a more steady airflow than exists in non-compounded wings of such type, and structurally, in the increased depth of spar as stated. The value of this structural improvement without aerodynamic loss will be obvious to engineers skilled in the art.

In my copending application No. 639,811 I describe a thick forward wing having a pronounced upward slope on the lower surface. But in my present invention the upper surface is modified instead of the lower, and as above stated it is part of my invention to make this possible with improved aerodynamic efficiency by, inter alia, setting the auxiliary with its leading edge directly below and sufficiently close to the trailing edge of the main wing so that its upper surface directly influences the airflow about the upper surface of the thicker main wing in compound cooperation therewith.

The preferred structural features of my invention may be briefly stated as follows: The auxiliary B has considerably less chord and thickness than the main wing A, and is so close up to the rear end of the main wing that a line drawn tangent to the upper surface of the main wing at the trailing edge will cut through the auxiliary when the chords of said main and auxiliary wings are in parallel relationship. The leading edge of the auxiliary B is directly below and substantially in the same vertical plane as the trailing edge of the main wing A, the gap being less than the maximum thickness of the wing, and the auxiliary wing being adapted to adjust its upper surface to form a vertual continuity of the upper surface of the main wing.

It will be understood that in actual application of my invention in designs a careful selection of the size and shape of the auxiliary wing as well as its orientation with the main wing are necessary, and these should be determined by experiment in a wind tunnel by the usual practise. But for the purpose of this specification the analysis herein is deemed sufficient. It will further be understood that the auxiliary wing may be either short in span or extend to the full span of the main wing.

In Fig. 3 I show a method of operating the auxiliaries on both sides of the machine so that they may be used as balancing members at the same time as for control of lift coefficient. In this mechanism I use two controls, $a$ and $b$, one for the right side and one for the left side. It will be clearly seen by the diagrammatic drawing of the operating parts that when the wheel $a$, for instance, is turned in either direction it will operate the left auxiliary wing by means of a tubular shaft $x$ connected with a sprocket $c$, chain $d$, and wires $e$ running over pulleys $f$ and $g$ to another chain and sprocket $h$ and $i$ respectively which turn about a worm-shaft $j$ connected with a rod $k$ (shown in Fig. 2) attached to a lever $l$ on the main spar $w$ of the auxiliary B. The same mechanism and operation apply to the right side which is controlled by the wheel $b$ operating the sprocket $z$ by means of another tubular shaft $y$. The control wheels $a$ and $b$ together with the tubular shafts $x$ and $y$ with their attached sprockets $c$ and $z$ are supported by a tubular casing $v$ which is shown with portion cut away to illustrate the shafts $x$ and $y$ passing through it. The casing $v$ is attached to a conventional control stick $m$ which operates the elevator or longitudinal rudder in the customary way. The column $m$ is pivoted at a point $n$ to the floor of the machine, and a lug $o$ forms a point of attachment for a rod (shown in Fig. 4) which connects with operating wires running to the elevator flap as usual.

When it is desired to operate the auxiliary wings on both sides simultaneously in the same direction the wheels $a$ and $b$ are turned simultaneously in opposite directions, and when they are used as ailerons the two wheels $a$ and $b$ are turned together in the same direction. It will thus be seen that the auxiliaries may be used oppositely as ailerons or in unison for total lift control, and when they are set for maximum lift the lateral balance may still be perfectly preserved by the operation of one auxiliary, leaving the other in its setting for maximum lift.

In actual designs it will be understood that the wheels $a$ and $b$ are made close together as shown in Fig. 4, so that they can be grasped together conveniently when they are operated together in the same direction for aileron control.

In the drawings I show a single compound system as it would be used in machines of the monoplane type with operating mechanism adapted to a single unit, but it will be obvious that my invention may be constructed in units superposed as in a biplane or in other forms of multiplane, such compound multiplanes having the operating mechanism extended by suitable means to interconnect the auxiliaries in the various units in any desired arrangement.

What I claim is:

1. A balanced lift regulating means for aircraft in combination, a main wing, an auxiliary wing having comparatively short chord, the leading edge of said auxiliary wing being in a plane below but not forward of the trailing edge of said main wing the gap being less than the maximum thickness of said main wing, said auxiliary wing adapted to tilt to vary the gap and said gap becoming less as the angle of said auxiliary wing is increased.

2. In combination, a main wing, a separate auxiliary wing having complete aerofoil cross-section and comparatively short chord, the leading edge of said auxiliary wing being in a vertical plane below the trailing edge of said main wing with a gap between, said gap being less than the maximum thickness of said main wing, said auxiliary wing adapted to tilt so that when its angle is increased the said gap is decreased.

3. The combination according to claim 2, the pivotal axis of said auxiliary wing being so arranged that when said auxiliary wing is tilted its upper surface forms a virtual continuity of the upper surface of said main wing and a slight gap still remains between said wings.

4. A balanced lift regulating means for aircraft comprising the combination of a main wing, pivoted auxiliary wings having comparatively short chords, the leading edges of said auxiliary wings being spaced from and in a plane below said main wing, the leading edge of said auxiliary wings being virtually in the same vertical plane as the trailing edge of the preceding wing, the gap between the main wing and said auxiliary wings being not greater than the maximum thickness of said main wing, and means whereby said auxiliary wings are tiltable to vary such gap, which becomes less as the angle of inclination of said auxiliary wings is increased.

In testimony whereof I hereunto affix my signature.

CHARLES A. WRAGG.